United States Patent
Kim et al.

(10) Patent No.: US 9,425,846 B2
(45) Date of Patent: Aug. 23, 2016

(54) METHOD AND ELECTRONIC DEVICE FOR CONTROLLING RADIATION POWER

(71) Applicant: Samsung Electronics Co., Ltd., Gyeonggi-do (KR)

(72) Inventors: Wan Gyu Kim, Gyeonggi-do (KR); Hong Chan Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/684,243

(22) Filed: Apr. 10, 2015

(65) Prior Publication Data

US 2015/0295613 A1   Oct. 15, 2015

(30) Foreign Application Priority Data

Apr. 11, 2014  (KR) .................. 10-2014-0043815

(51) Int. Cl.
*H04B 1/38* (2015.01)
*H04B 1/3827* (2015.01)

(52) U.S. Cl.
CPC .................................. *H04B 1/3838* (2013.01)

(58) Field of Classification Search
CPC .......................... H04W 52/52; H04B 17/318
USPC ............ 455/550.1, 522, 11.1, 13.4, 127.1, 455/127.5, 115.1, 115.3–115.4, 132–138, 455/161.1, 161.3, 226.4
See application file for complete search history.

(56) References Cited

U.S. PATENT DOCUMENTS

| | | | |
|---|---|---|---|
| 8,417,296 B2 | 4/2013 | Caballero et al. | |
| 8,483,632 B2 | 7/2013 | Asrani et al. | |
| 8,731,576 B2 * | 5/2014 | Hamabe | H04W 72/04 455/433 |
| 2004/0204183 A1 * | 10/2004 | Lencevicius | H04M 1/663 455/574 |
| 2007/0171996 A1 * | 7/2007 | Miyabayashi | H04L 1/0003 375/295 |
| 2009/0305742 A1 | 12/2009 | Caballero et al. | |
| 2011/0117973 A1 | 5/2011 | Asrani et al. | |
| 2013/0172045 A1 | 7/2013 | Caballero et al. | |
| 2015/0005026 A1 * | 1/2015 | Wild | H04W 52/367 455/522 |

\* cited by examiner

*Primary Examiner* — Cong Tran

(57) ABSTRACT

A radiation power controlling method includes: detecting a user input for setting a radiation power; determining a radiation environment of an antenna on the basis of at least the detected user input; and setting the radiation power of the antenna according to the determined radiation environment.

19 Claims, 10 Drawing Sheets

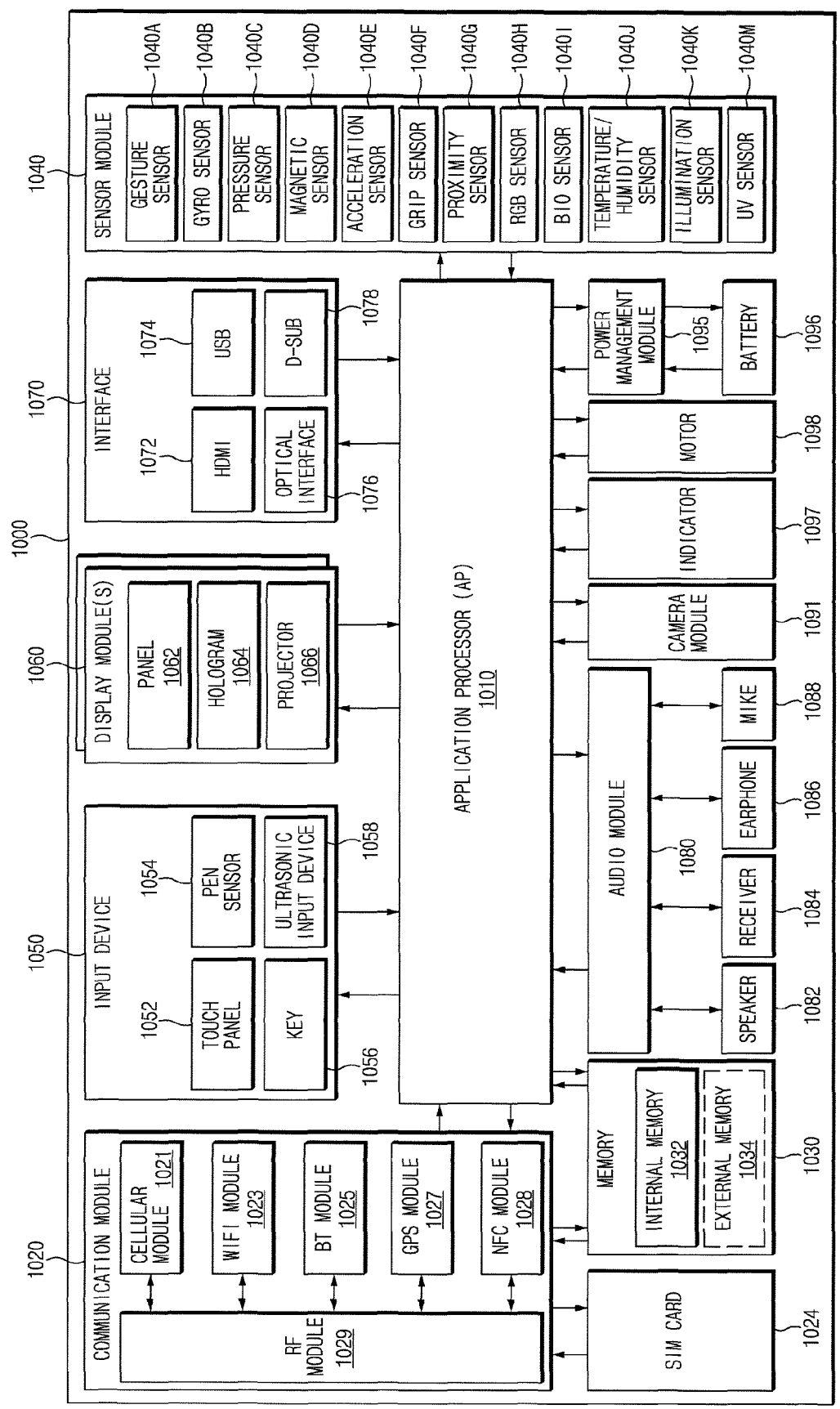

METHOD AND ELECTRONIC DEVICE FOR CONTROLLING RADIATION POWER

CROSS-REFERENCE TO RELATED APPLICATION(S) AND CLAIM OF PRIORITY

The present application is related to and claims priority of Korean patent application No. 10-2014-0043815 filed Apr. 11, 2014, the disclosure of which is hereby incorporated in its entirety by reference.

TECHNICAL FIELD

The present application relates to an antenna radiation power control of an electronic device.

BACKGROUND

In general, an electronic device may perform communication with an external device through an antenna. An antenna of the electronic device may operate according to a specified radiation power and its communication quality may vary according to the intensity of a corresponding radiation power.

In conventional techniques, antenna radiation power is fixed within an initially set range. Therefore, when an event that requires radiation power adjustment occurs, an initially set radiation power is maintained.

SUMMARY

To address the above-discussed deficiencies, it is a primary object to provide a radiation power controlling method for setting radiation power according to a radiation environment determined by a user's input.

Various embodiments of the disclosure are directed to providing a radiation power controlling method for dynamically corresponding to a corresponding event when an event that requires radiation power adjustment generated from inside or outside an electronic device occurs.

According to an embodiment of the present disclosure, a radiation power controlling method includes: detecting a user input for setting a radiation power; determining a radiation environment of an antenna on the basis of at least the detected user input; and setting the radiation power of the antenna according to the determined radiation environment.

According to an embodiment of the present disclosure, an electronic device includes: a display configured to be functionally connected to the electronic device and display a user interface (UI) for determining a radiation environment of an antenna; and a processor configured to determine the radiation environment on the basis of a user input for the UI and set a radiation power of the antenna according to the determined radiation environment.

According to an embodiment of the present disclosure, provided is a non-transitory computer-readable storage medium storing an instruction for controlling an operation of an electronic device, wherein the instruction allows the electronic device to perform detecting a user input for setting a radiation power; determining a radiation environment of an antenna on the basis of at least the detected user input; and setting the radiation power of the antenna according to the determined radiation environment.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates an electronic device according to various embodiments of the present disclosure.

DETAILED DESCRIPTION

Figure 1:
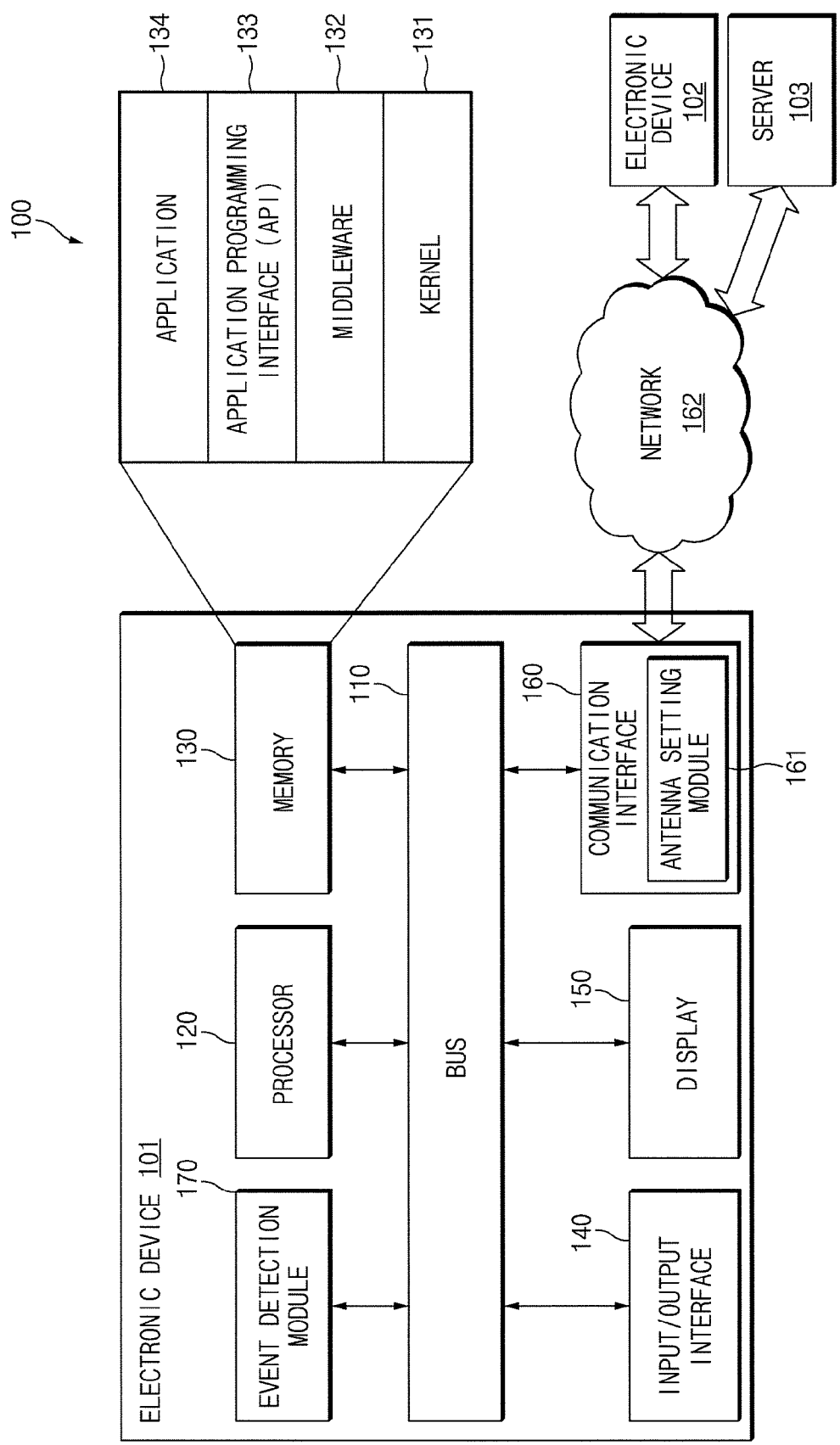
FIG. 1 illustrates a network environment including an electronic device according to various embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device.

Hereinafter, various embodiments of the present disclosure are disclosed with reference to the accompanying drawings. Various embodiments of the present disclosure are shown in the drawings and related details are described but various modifications are possible and more embodiments can be introduced. Thus, it is intended that the present disclosure covers the modifications and variations of this disclosure provided they come within the scope of the appended claims and their equivalents. With respect to the descriptions of the drawings, like reference numerals refer to like elements.

The term "include," "comprise," "including," or "comprising," specifies a property, a region, a fixed number, a step, a process, an element and/or a component but does not exclude other properties, regions, fixed numbers, steps, processes, elements and/or components. The meaning of "include," "comprise," "including," or "comprising," specifies a property, a region, a fixed number, a step, a process, an element and/or a component but does not exclude other properties, regions, fixed numbers, steps, processes, elements and/or components.

In this specification, the expression "or" includes any or all combinations of words listed. For example, "A or B" can include A or include B or include both A and B.

The terms 'first' and/or 'second' can be used to describe various elements; however, the elements should not be limited by these terms. For instance, such terms do not limit the order and/or priority of the elements. The expressions are used to distinguish one component from another component. For instance, both "a first user device" and "a second user device" indicate a user device but indicate different user devices from each other For example, a first component can be referred to as a second component and vice versa without departing from the scope of the present disclosure.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Terms used in this specification are used to describe specific embodiments, and are not intended to limit the scope of the present disclosure. The terms of a singular form can include plural forms unless otherwise specified.

Otherwise indicated herein, all the terms used herein, which include technical or scientific terms, can have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning.

An electronic device according to various embodiments of the present disclosure can have a communication function. For instance, electronic devices can include at least one of smartphones, tablet personal computers (PCs), mobile phones, video phones, electronic book (e-book) readers, desktop personal computers (PCs), laptop personal computers (PCs), netbook computers, personal digital assistants (PDAs), portable multimedia player (PMPs), MP3 players, mobile medical devices, cameras, and wearable devices (e.g., head-mounted-devices (HMDs) such as electronic glasses, electronic apparel, electronic bracelets, electronic necklaces, electronic accessories, electronic tattoos, and smart watches).

According to some embodiments, an electronic device can be smart home appliances having communication function. The smart home appliances can include at least one of, for example, televisions, digital video disk (DVD) players, audios, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, and electronic picture frames.

According to embodiments of the present disclosure, an electronic device can include at least one of various medical devices (for example, magnetic resonance angiography (MRA) devices, magnetic resonance imaging (MRI) devices, computed tomography (CT) devices, medical imaging devices, ultrasonic devices, etc.), navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, car head units, industrial or household robots, financial institutions' automatic teller's machines (ATMs), and stores' point of sales (POS).

According to an embodiment of the present disclosure, an electronic device includes at least one of furniture or buildings/structures having a communication function, electronic boards, electronic signature receiving devices, projectors, or various measuring instruments (for example, water, electricity, gas, or radio signal measuring instruments). An electronic device according to an embodiment of the present disclosure can be one of the above-mentioned various devices or a combination thereof. Additionally, an electronic device according to an embodiment of the present disclosure can be a flexible device. Furthermore, it is apparent to those skilled in the art that an electronic device according to an embodiment of the present disclosure is not limited to the above-mentioned devices.

Hereinafter, an electronic device according to various embodiments of the present disclosure will be described in more detail with reference to the accompanying drawings. The term "user" in various embodiments can refer to a person using an electronic device or a device using an electronic device (for example, an artificial intelligent electronic device).

FIG. 1 is a block diagram illustrating a network environment including an electronic device according to various embodiments of the present disclosure.

Referring to FIG. 1, the electronic device 101 includes a bus 110, a processor 120, a memory 130, an input/output interface 140, a display 150, a communication interface 160, and an event detection module 170.

The bus 110 can be a circuit connecting the above-mentioned components to each other and delivering a communication signal (for example, a control message) there between.

The processor 120, for example, receives an instruction from the above other components (for example, the memory 130, the input/output interface 140, the display 150, the communication interface 160, or the event detection module 170) through the bus 110, interprets the received instruction, and performs operations and data processing in response to the interpreted instruction.

According to various embodiments of the present disclosure, the processor 120 sets a radiation power of an antenna. The processor 120 adjusts the communication quality of an antenna by changing radiation power. The processor 120 sets a radiation power of an antenna on the basis of specific absorption rate (SAR), that is, an amount of electromagnetic waves that can be absorbed by the human body, which is determined according to a mobile phone radio grading system. The processor 120 determines the case that an SAR value generated from an antenna by a set radiation power is less than a reference value allowed according to the mobile phone radio grading system, as "radiation power—low" and determines the case that the SAR value is more than the reference value, as "radiation power—high".

For example, in the case that a reference SAR value according to the mobile phone radio grading system is about 1.6 W/Kg, when an event that requires increasing communication quality occurs, the processor 120 sets radiation power to a "high" state. In this case, an SAR value generated by a corresponding radiation power corresponds to more than about 1.6 W/Kg. When an event that requires protecting a user occurs, the processor 120 sets radiation power to a "low" state. In this case, an SAR value generated by a corresponding radiation power corresponds to less than about 1.6 W/Kg.

Hereinafter, when radiation power is more than the reference value, a "high" state is used and when not, a "low" state is used. However, the "high" or "low" state of radiation power is not a fixed power value and can be set to a specified value by a user or the processor 120. According to various embodiments of the present disclosure, the processor 120 divides an SAR value generated from radiation power by predetermined intervals and adjusts a radiation power of an antenna according to a corresponding interval value.

The memory 130 stores an instruction or data received from the processor 120 or other components (for example, the input/output interface 140, the display 150, the communication interface 160, or the event detection module 170) or an instruction or data generated from the processor 120 or other components. The memory 130, for example, includes programming modules, for example, a kernel 131, a middleware 132, an application programming interface (API) 133, and an application 134. Each of the above-mentioned programming modules can be configured with software, firmware, hardware, or a combination thereof.

The kernel 131 controls or manage system resources (for example, the bus 110, the processor 132, or the memory 133) used for performing operation or functions implemented by the remaining other programming modules, for example, the middleware 134, the API 120, or the application 130. Additionally, the kernel 131 provides an interface for accessing an individual component of the electronic device 101 from the middleware 132, the API 133, or the application 134 and controlling or managing the individual component.

The middleware 132 serves as an intermediary role for exchanging data between the API 133 or the application 134 and the kernel 131 through communication. Additionally, in relation to job requests received from the applications 132, the middleware 134 performs a control (for example, scheduling or load balancing) for the job requests by using a method of assigning a priority for using a system resource (for example, the bus 101, the processor 110, or the memory 134) of the electronic device 101 to at least one application among the applications 120.

The API 133, as an interface through which the application 134 controls a function provided from the kernel 131 or the middleware 132, includes at least one interface or function (for example, an instruction) for file control, window control, image processing, or character control.

According to various embodiments of the present disclosure, the application 134 can include an SMS/MMS application, an e-mail application, a calendar application, an alarm application, a health care application (for example, an application for measuring an exercise amount or blood sugar), or an environmental information application (for example, an application for providing pressure, moisture, or temperature information). Additionally or alternatively, the application 134 can be an application relating to information exchange between the electronic device 101 and an external electronic device (for example, the electronic device 102). The application relating to information exchange, for example, includes a notification relay application for delivering specific information to the external electronic device or a device management application for managing the external electronic device.

For example, the notification relay application can have a function for delivering to an external electronic device (for example, the electronic device 102) notification information occurring from another application (for example, an SMS/MMS application, an e-mail application, a health care application, or an environmental information application) of the electronic device 101. Additionally or alternatively, the notification relay application 1134 receives notification information from an external electronic device (for example, the electronic device 102) and can then provide the received notification information to a user. The device management application, for example, can manage (for example, install, delete, or update) a function (for example, turning on/off an external electronic device itself (or some components) or adjusting the brightness (or resolution) of a display) for at least part of an external electronic device (for example, the electronic device 102) communicating with the electronic device 101, an application operating in the external electronic device, or a service (for example, a call service or a message service) provided from the external electronic device.

According to various embodiments of the present disclosure, the application 134 includes an application specified according to the attribute (for example, a type of an electronic device) of the external electronic device (for example, the electronic device 102). For example, when an external electronic device is an MP3 player, the application 134 includes an application relating to music playback. Similarly, when an external electronic device is a mobile medical device, the application 134 includes an application relating to heath care. According to an embodiment of the present disclosure, the application 134 includes at least one of an application specified to the electronic device 101 or an application received from an external electronic device (for example, the server 103 or the electronic device 102).

The memory 130 stores a radiation environment selected through a user input. The radiation environment includes a plurality of modes setting radiation power according to a specified condition. For example, when a user selects a first mode as the radiation environment, the memory 130 stores a corresponding selection result. The processor 120 adjusts the radiation power when an event of a condition specified according to the stored result occurs. According to an embodiment of the present disclosure, the memory 130 stores a radiation power adjustment app list. The radiation power adjustment application (app) list corresponds to a list of apps for setting antenna radiation power to a specified value while an app is selected by a user and executed.

The input/output interface 140 delivers an instruction or data inputted from a user through an input/output device (for example, a sensor, a keyboard, or a touch screen), to the processor 120, the memory 130, the communication interface 160, or the first event detection module 170 through the bus 110. For example, the input/output interface 140 provides data on a user's touch inputted through a touch screen to the processor 120. Additionally, the input/output interface 140 outputs an instruction or data received from the processor 120, the memory 130, the communication interface 160, or the event detection module 170 through the bus 1310, through the input/output device (for example, a speaker or a display). For example, the input/output interface 140 outputs voice data processed through the processor 120 to a user through a speaker.

The input/output interface 140 generates an operation signal for operating the electronic device 101 according to an input from a user and can then provide the generated operation signal to the processor 120. The input/output interface 140 can be formed with an input device, for example, a key button, a keyboard, a keypad, a touch pad, and a touch screen.

The display 150 displays various information (for example, multimedia data or text data) to a user. The display 150 displays an execution screen operating according to a control of the processor 120. For this, the display 150 includes a liquid crystal display (LCD) and a touch screen. When the display 150 is a touch screen, it can perform the role of the input/output interface 140 simultaneously and can generate a touch signal according to a touch event of a user to provide the generated touch signal to the processor 120.

According to an embodiment of the present disclosure, the display 150 displays a screen for selecting a radiation environment of an antenna by a user. Additionally, when a specific mode is selected by a user, the display 150 displays a screen for selecting an additional option according to a corresponding mode.

The communication interface 160 connects a communication between the electronic device 101 and an external device (for example, the electronic device 102 or the server 103). For example, the communication interface 160 communicates with the external device in connection to the network 162 through wireless communication or wired communication. The wireless communication includes at least one of wireless fidelity (WiFi), BLUETOOTH (BT), near field communication (NFC), global positioning system (GPS), or cellular communication (for example, LTE, LTE-A, CDMA, WCDMA, UMTS, WiBro, or GSM). The wired communication includes at least one of universal serial bus (USB), high definition multimedia interface (HDMI), recommended standard 232 (RS-232), or plain old telephone service (POTS), for example.

An antenna setting module 161 sets a radiation power of an antenna according to a control of the processor 120. According to an embodiment of the present disclosure, the antenna setting module 161 receives a setting file (for example, an nv or cfg file) from the processor 120 and sets radiation power through a corresponding file. According to another embodiment of the present disclosure, the antenna setting module 161 receives a setting file for antenna radiation power from an external device and sets radiation power according to a corresponding setting file.

According to an embodiment of the present disclosure, the network 162 can be telecommunications network. The telecommunications network includes at least one of computer network, internet, internet of things, or telephone network. According to an embodiment of the present disclosure, a protocol (for example, transport layer protocol, data link layer protocol, or physical layer protocol) for communication between the electronic device 101 and an external device can be supported by at least one of the application 134, the application programming interface 133, the middleware 132, the kernel 131, or the communication interface 160.

According to an embodiment of the present disclosure, the server 103 supports the driving of the electronic device 101 by performing at least one of operations (or functions) implemented in the electronic device 101.

The event detection module 170 detects the occurrence of an event (hereinafter referred to as a power adjustment event) set to adjust a radiation power of an antenna. The power adjustment event corresponds to an event inside/outside the electronic device 101 that requires adjusting a radiation power of an antenna. Through FIGS. 2 to 10, additional information on the event detection module 170 can be provided.

Figure 2:
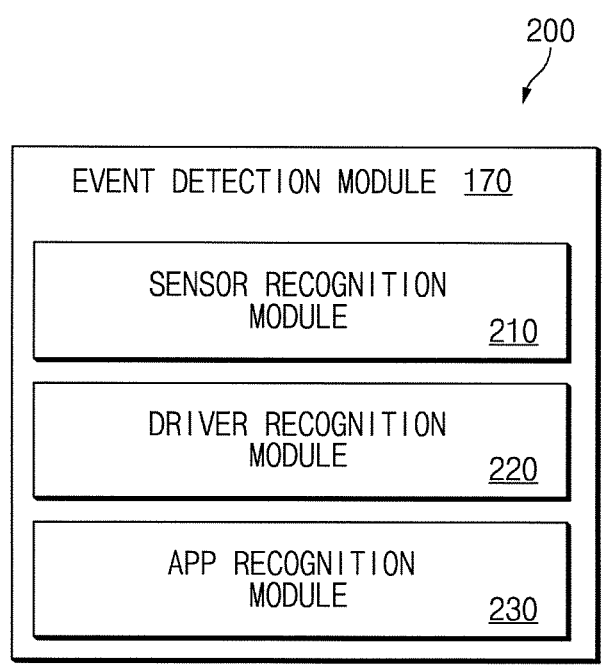
FIG. 2 illustrates a control module of an electronic device according to various embodiments of the present disclosure.

FIG. 2 is a block diagram 200 illustrating an event detection module 170 of an electronic device (for example, the electronic device 101) according to various embodiments of the present disclosure. Referring to FIG. 2, the event detection module 170 includes a sensor recognition module 210, a driver recognition module 220, and an app recognition module 230.

The sensor recognition module 210 according to various embodiments of the present disclosure collects recognition information on a user detected from at least one sensor included in the electronic device 101. The sensor recognition module 210 detects the occurrence of an event (hereinafter referred to as a sensor event) that requires adjusting radiation power on the basis of the recognition information of a sensor. When a sensor event occurs, the sensor recognition module 210 provides the recognition information of a sensor to the processor 120. According to an embodiment of the present disclosure, the sensor includes at least one of a proximity sensor or a grip sensor. The proximity sensor corresponds to a sensor recognizing whether a user approaches toward the electronic device 101 or a user approaches within a preset range around the electronic device 101. The grip sensor corresponds to a sensor recognizing whether a user grips the electronic device 101 by the hand. The grip sensor corresponds to a sensor operating when a user grips the electronic device 101 and more than a specified pressure is detected. The grip sensor can be disposed on at least one of the upper, lower, left or right side of the electronic device 101. However, the position of the grip sensor can vary according to a design environment. When a user contacts a grip sensor equipped at the electronic device 101 with more than a constant pressure, the sensor recognition module 210 provides the corresponding recognition information to the processor 120.

The sensor according to various embodiments of the present disclosure includes at least one of a gyro sensor or an acceleration sensor. The gyro sensor corresponds to a device measuring an angular velocity of an electronic device. The acceleration sensor corresponds to a device measuring a linear motion change in a specified direction. When an acceleration change or a linear motion change of more than a specified value occurs, the sensor recognition module 210 provides corresponding recognition information to the processor 120.

The sensor includes at least one of a bio sensor or a temperature sensor. When it is recognized that a user approaches the electronic device 101 through the bio sensor or the temperature sensor, the sensor recognition module 210 provides corresponding recognition information to the processor 120. For example, when a user corresponding to the bio sensor is recognized or a sensed temperature is increased more than a reference value due to the user's grip, the sensor recognition module 210 provides corresponding recognition information to the processor 120.

However, the sensor is not limited thereto and can correspond to various sensors (for example, a gesturer sensor and an infrared sensor) recognizing a user's motion.

The driver recognition module 220 recognizes whether an event (hereinafter referred to as a driver event) transmitting data to the outside through the antenna setting module 161 on a driver (for example SD/MMC) stage or information on a transmission speed of corresponding data. The driver recognition module 220 can provide whether a driver event occurs or information on a data transmission speed to the processor 120.

The app recognition module 230 recognizes execution information of an application executable on the electronic device 101. The application (app) recognition module 230 provides information on the occurrence of an event (hereinafter referred to as an app related event) that requires adjusting radiation power relating to an app execution to the processor 120. The app recognition module 230 recognizes at least one of whether to execute an application, a start time, or an end time.

An electronic device according to various embodiments of the present disclosure includes a display functionally connected to the electronic device to display a user interface for determining a radiation power of an antenna and a processor determining the radiation environment on the basis of a user input for the UI and setting a radiation power of the antenna according to the determined radiation environment.

According to various embodiments of the present disclosure, the electronic device further includes an event detection module detecting a specified event and when the specified event is detected, the processor resets the radiation power on the basis of at least one of the determined radiation environment or the event. When the radiation environment is a first or second mode and the execution of an application specified by a user occurs, the processor can set the radiation power to less than a specified reference value. When the radiation environment is a third mode and the execution of an application specified by a user occurs, the processor can set the radiation power to more than a specified reference value.

According to various embodiments of the present disclosure, the specified event can correspond to at least one of a usage state of an electronic device by the user detected by a sensor included therein, a state for transmitting data to the outside through the electronic device, or an execution state of a specified application.

Figure 3:
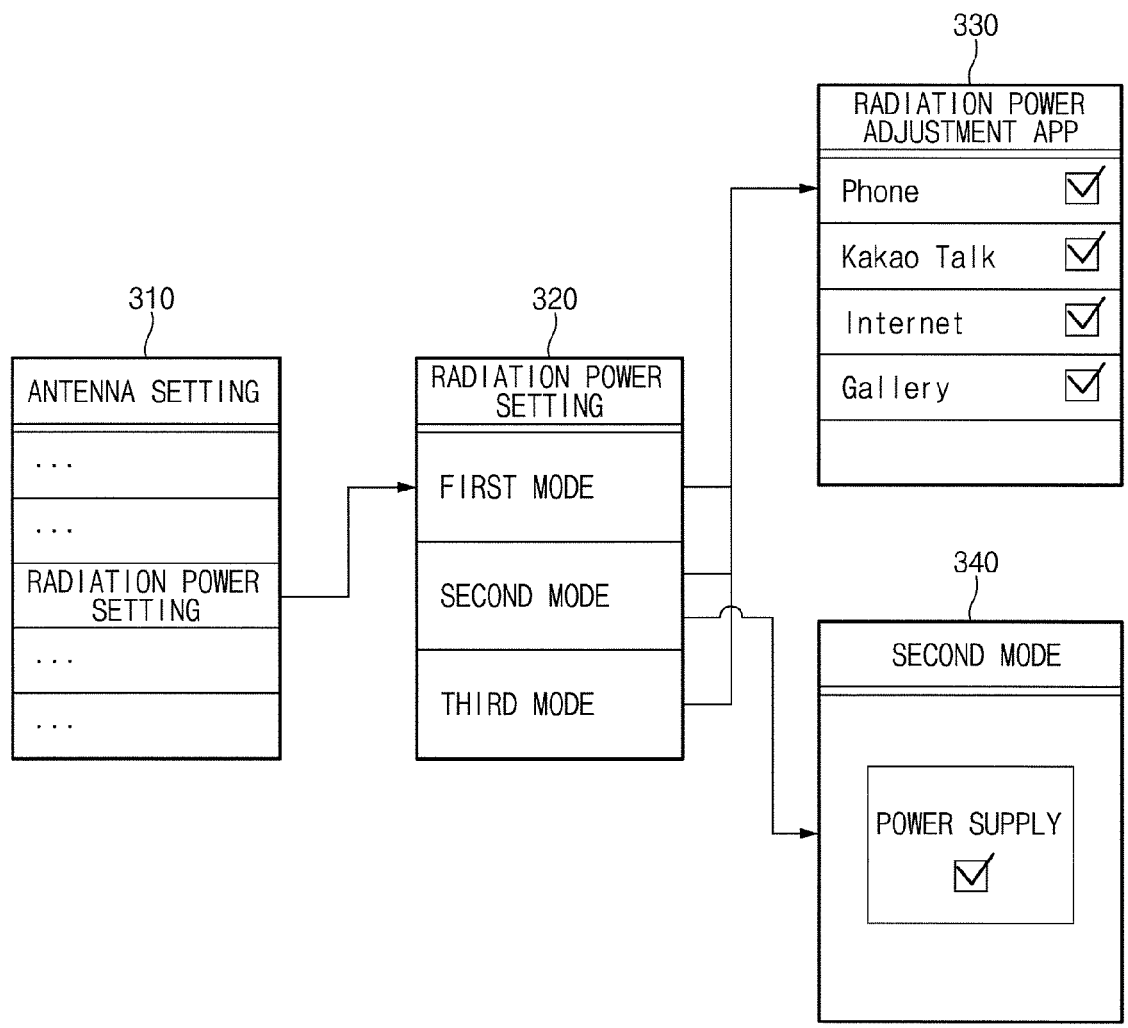
FIG. 3 illustrates an antenna radiation power setting according to various embodiments of the present disclosure.

According to various embodiment of the present disclosure, when the transmission speed of the data is less than a reference minimum value, the processor sets the radiation power to less than a reference value or when the transmission speed of the data is more than a reference maximum value, the processor sets the radiation power to more than a reference value FIG. 3 is a view illustrating an antenna radiation power setting according to various embodiments of the present disclosure.

Referring to FIG. 3, the processor 120 displays a screen 310 for antenna setting through the display 150. The screen 310 includes an item for radiation power setting among various items relating to antenna setting. When a corresponding item is selected by a user, the processor 120 displays a radiation environment determination screen 320 of an antenna through the display 150.

The radiation environment determination screen 320 can be configured to select one of a first mode, a second mode, or a third mode by a user. The first mode can correspond to a balanced mode repeatedly controlling radiation power in consideration of the operating performance of a running application and the battery performance in the electronic device 101. The second mode can correspond to a high performance mode maintaining radiation power as "high" by reflecting a power supply state or a battery remaining state to the electronic device 101. The third mode can correspond to a safe mode setting radiation power to "low" under a specified condition. When at least one mode is selected by a user, the processor 120 displays a screen for selecting an additional option according to a corresponding mode through the display 150. Although a case including the first to third modes is exemplarily shown in FIG. 3, the radiation environment determination screen 320 further includes an additional mode (for example, an auto setting mode and a user custom mode) addition to the first to third modes.

When at least one mode is selected by a user, the processor 120 displays a radiation power adjustment app list 330 through the display 150. The radiation power adjustment app list 330 corresponds to a list of an application selected by a user to set a radiation power of an antenna to a specified value (for example, "high" or "low"). A user includes an application for adjusting radiation power in a corresponding list and can then adjust the radiation power according to an application execution.

According to an embodiment of the present disclosure, the processor 120 sets a radiation power for an application included in the radiation power adjustment app list 330 to "low" in the first mode or the second mode. Once a corresponding application starts, the processor 120 sets radiation power to "low" and once the corresponding application ends, sets the radiation power to "high". A user includes an application that is less frequently used and has relatively low data traffic in a corresponding list and can then adjust the radiation power according to a corresponding application execution.

According to another embodiment of the present disclosure, the processor 120 sets a radiation power for an application included in the radiation power adjustment app list 330 to "high" in the third mode. A user includes an application that is more frequently used and has relatively high data traffic in a corresponding list and can then adjust the radiation power according to a corresponding application execution.

According to various embodiments of the present disclosure, the processor 120 recommends to a user an application selected according to an execution method (for example, frequency of use, processor usage, and use of a specified communication module) of an application. According to the recommended contents, a user includes an application (for example, an application using a communication module frequently) that requires increasing radiation power in the radiation power adjustment app list 330 and can then set the radiation power to "high" according to the execution of a corresponding application. On the contrary, according to the recommended contents, a user includes an application (for example, an application using a communication module less) that requires decreasing radiation power in the radiation power adjustment app list 330 and can then set the radiation power to "low" according to the execution of a corresponding application.

According to various embodiments of the present disclosure, when the second mode is selected by a user, the processor 120 displays a power supply confirmation screen 340. When power is supplied to the electronic device 101 in a wired or wireless manner, the processor 120 can be set to enter the second mode. Additionally, when a data cable is connected to the electronic device 101, the processor 120 can be set to enter the second mode. According to various embodiments of the present disclosure, the processor 120 can be set to enter the second mode on the basis of the battery remaining of the electronic device 101. For example, when the battery remaining of the electronic device 101 is less than about 15%, the processor 120 can be set not to enter the second mode and sets radiation power to "low". Additionally, when the battery remaining of the electronic device 101 is more than about 15%, the processor 120 can be set to enter the second mode and can then set radiation power to "high".

Figure 4:
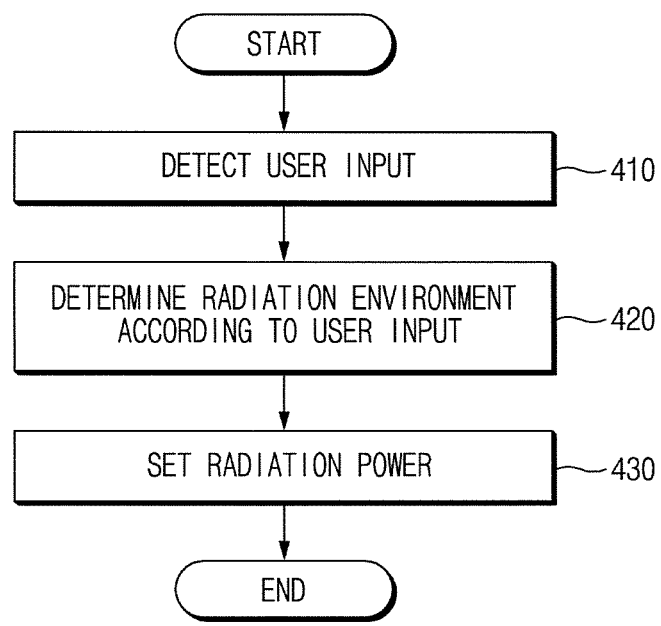
FIG. 4 illustrates an antenna radiation power control process according to various embodiments of the present disclosure.

FIG. 4 is a flowchart illustrating an antenna radiation power control process according to various embodiments of the present disclosure.

Referring to FIG. 4, in operation 410, the processor 120 detects a user input for setting radiation power through the input/output interface 140. According to various embodiments, the processor 120 provides a user interface (UI) for determining a radiation environment of an antenna to detect a user's input.

In operation 420, the processor 120 determines the radiation environment on the basis of the detected user input. The radiation environment includes a first mode, a second mode, and a third mode. The first mode can correspond to a mode (for example, a balanced mode) dynamically controlling a radiation power of an antenna according to the occurrence of an event that requires adjusting power generated inside/outside the electronic device 101. The second mode can correspond to a mode (for example, a performance mode) maintaining radiation power as "high" by reflecting a power supply state. The third mode can correspond to a mode (for example, a safe mode) setting radiation power to "low" under a specified condition.

In operation 430, the processor 120 sets the radiation environment of the antenna according to the determined radiation environment. When a radiation environment determined by a user is the first mode, the processor 120 sets the radiation power to "high" first in the case of the first mode and can be set to adjust the radiation power according to a an event that occurs later. When a radiation environment determined by a user is the second mode, when power is supplied to the electronic device 101 in a wired or wireless manner or when the battery remaining is more than a reference value, the processor 120 sets radiation power to "high". When a radiation environment determined by a user is the third mode, the processor 120 sets radiation power to "low".

Figure 5:
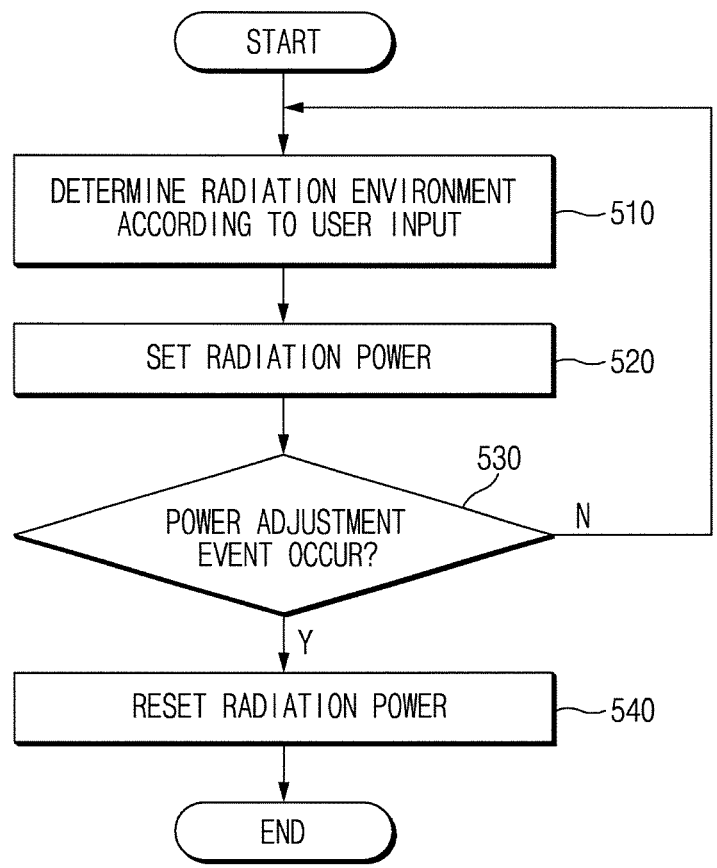
FIG. 5 illustrates a radiation power control process when an event occurs according to various embodiments of the present disclosure.

FIG. 5 is a flowchart illustrating a radiation power control process when an event occurs according to various embodiments of the present disclosure.

Referring to FIG. 5, in operation 510, the processor 120 determines a radiation environment according to a user input. According to an embodiment of the present disclosure, operation 510 for determining the radiation environment according to the user input can be excluded in determining a radiation environment if there is a preset environment in the electronic device 101. For example, the radiation environment can be set to the first mode in the initial setting of the electronic device 101 without an additional selection operation by a user.

In operation 520, the processor 120 sets a radiation power of an antenna according to a radiation environment determined on the basis of a user input.

In operation 530, the event detection module 170 detects whether a power adjustment event occurs. The power adjustment event corresponds to an event inside/outside the electronic device 101 that requires adjusting a radiation power of an antenna. The power adjustment event corresponds to one of a sensor event, a driver event or an app related event. The sensor event corresponds to an event that requires adjusting radiation power on the basis of recognition information detected from at least one sensor in the electronic device 101. For example, the sensor event corresponds to an event that a user is close enough to be recognized by a sensor included in the electronic device 101. The driver event corresponds to an event transmitting data to the outside through the antenna setting module 161 on a driver (SD/MMC) stage of the electronic device 101. The app related event corresponds to an event that requires adjusting radiation power relating to app execution. The processor 120 maintains a current radiation power state when a power adjustment event does not occur.

In operation 540, when the power adjustment event occurs, the processor 120 resets the radiation power on the basis of at least one of a radiation environment or a corresponding power adjustment event. When the sensor event occurs, the processor 120 determines that a user is close to the corresponding electronic device 101 and sets a radiation power of an antenna to "low".

When the driver event occurs, the processor 120 compares a data transmission speed by a corresponding event and a reference value and can then reset a radiation power of an antenna. According to an embodiment of the present disclosure, when the data transmission speed of the driver event exceeds a reference maximum value (a reference maximum value or over), the processor 120 sets an antenna radiation power to "high" to improve the communication efficiency of a corresponding antenna. On the contrary, when the data transmission speed of the driver event is less than a reference minimum value (a reference minimum value or less), the processor 120 sets an antenna radiation power to "low" to reduce the communication efficiency of a corresponding antenna.

When the app related event occurs, the processor 120 dynamically sets a radiation power of an antenna according the execution of a corresponding application to maintain communication performance fit for each application. According to an embodiment of the present disclosure, when radiation power is set to "low" by a user, the processor 120 controls the radiation power on the basis of the selected radiation power adjustment app list 230.

Figure 6:
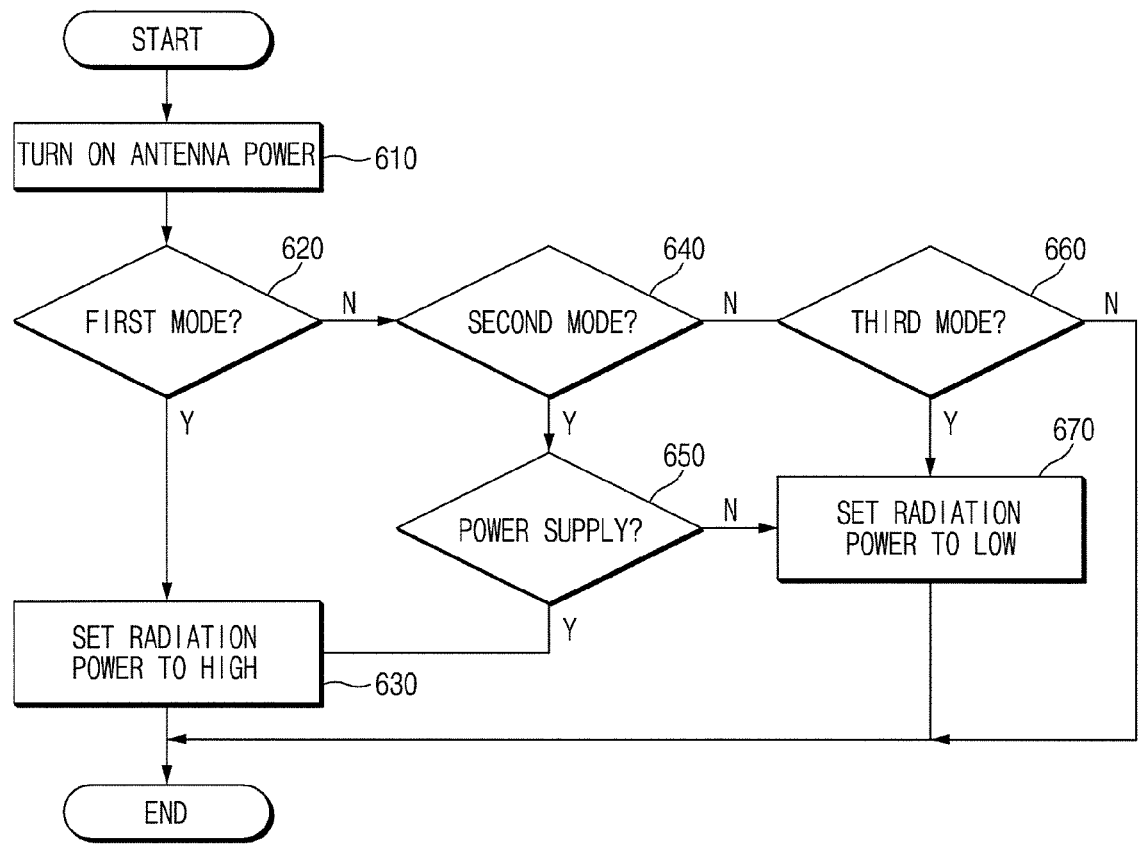
FIG. 6 illustrates an antenna radiation power initial setting process according to various embodiments of the present disclosure.

FIG. 6 is a flowchart illustrating an antenna radiation power initial setting process according to various embodiments of the present disclosure.

Referring to FIG. 6, in operation 610, when an antenna is turned on, the processor 120 sets radiation power according to a radiation environment determined by a user.

In operation 620, the processor 120 confirms whether a radiation environment determined by a user is the first mode. The first mode can correspond to a mode setting antenna radiation power to "high" and then repeatedly controlling radiation power in consideration of the operating performance of a running application and the battery performance in the electronic device 101.

In operation 630, when a radiation environment determined by a user is the first mode, the processor 120 sets radiation power to "high". The processor 120 initially sets radiation power to "high" in order to improve antenna communication performance in the first mode and can then adjust a corresponding radiation power according to a power adjustment event occurrence.

In operation 640, the processor 120 confirms whether a radiation environment determined by a user is a second mode. The second mode corresponds to a mode maintaining radiation power as "high" by reflecting a power supply state or a battery remaining state to the electronic device 101.

In operation 650, when a radiation environment determined by a user is the second mode, the processor 120 confirms whether power is supplied to the corresponding electronic device 101. When power is supplied in a wired or wireless manner in order to prevent battery discharge due to power loss, the processor 120 can be set to enter the second mode. When power is supplied in the second mode, the processor 120 sets radiation power to "high".

In operation 660, the processor 120 confirms whether a radiation environment corresponds to a third mode. The third mode corresponds to a mode setting radiation power to "low" under a specified condition.

In operation 670, when a radiation environment corresponds to the third mode, the processor 120 sets radiation power to "low". The processor 120 can be set to maintain SAR of less than a reference value according to a mobile phone radio grading system without being affected by power adjustment event occurrence in the third mode.

Figure 7:
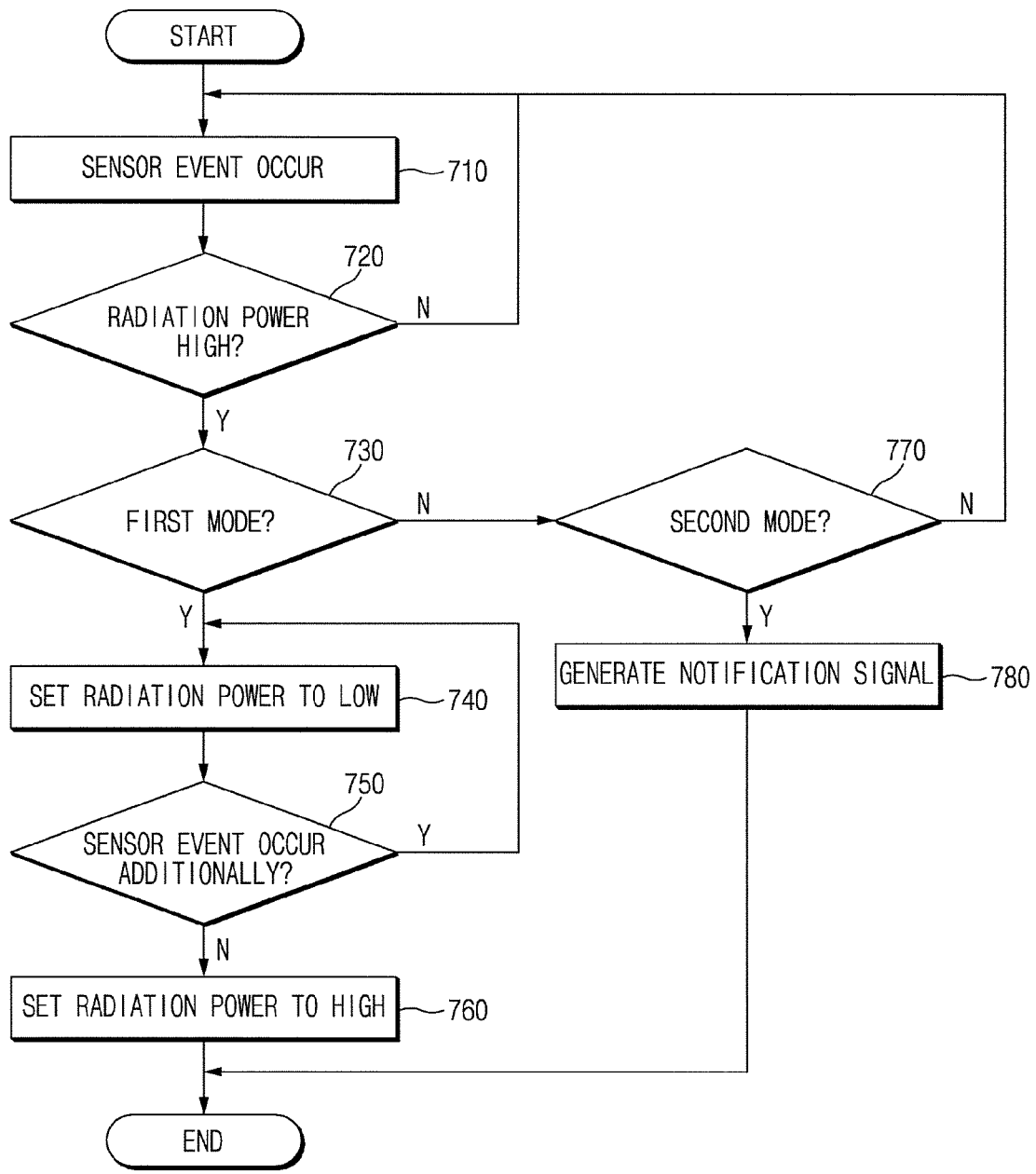
FIG. 7 illustrates a radiation power control process when a sensor event occurs according to various embodiments of the present disclosure.

FIG. 7 is a flowchart illustrating a radiation power control process when a sensor event occurs according to various embodiments of the present disclosure.

Referring to FIG. 7, in operation 710, the sensor recognition module 210 detects the occurrence of a sensor event after a radiation environment is determined by a user. The sensor event corresponds to an event that requires adjusting radiation power according to recognition information detected from at least one sensor in the electronic device 101.

In operation 720, the processor 120 confirms whether radiation power is set to "high". When the radiation power is set to "low", the processor 120 returns to an event standby state. When the radiation power is set to "high", the processor 120 dynamically controls the radiation power according to a radiation environment determined by a user so as to protect a user from electromagnetic waves.

In operation 730, the processor 120 confirms whether a radiation environment determined by a user is the first mode (for example, a balanced mode).

In operation 740, in the case of the first mode, the processor 120 sets radiation power to "low". When a user's motion is recognized around the electronic device 101, the processor 120 lowers radiation power to protect a user.

In operation 750, the processor 120 confirms whether a sensor event occurs additionally. When a sensor event occurs additionally, the processor 120 confines again whether the sensor event occurs additionally after waiting a preset time (for example, 30 sec). When a user is close to the electronic device 101 and stays, the processor 120 maintains radiation power as a "low" state to protect a user.

In operation 760, when a sensor event does not occur additionally, the processor 120 set a corresponding radiation power to "high" to increase antenna communication efficiency.

According to an embodiment of the present disclosure, the sensor recognition module 210 receives direction information of the electronic device 101 through a geomagnetic sensor and can then provide it to the processor 12. When the direction of the electronic device 101 is changed according to a pattern based on corresponding direction information, the processor 120 sets radiation power by a predetermined value according to a corresponding pattern.

According to an embodiment of the present disclosure, the sensor recognition module 210 receives position information (for example, GPS information) or moving speed information of the electronic device 101 through a geomagnetic sensor and can then provide it to the processor 120. When a moving speed of the corresponding electronic device 101 is more than a specified value, the processor 120 displays a pop-up screen for allowing a user to determine whether to set radiation power to "low" through the display 150. When a moving speed of the electronic device 101 is less than a specified value, the processor 120 displays a pop-up screen for allowing a user to determine whether to set radiation power to "high" through the display 150. According to various embodiments of the present disclosure, when a moving speed of the electronic device 101 is within a specified interval range, the processor 120 displays a pop-up screen for recommending a specified radiation power for the specified interval range to a user.

According to an embodiment of the present disclosure, the sensor recognition module 210 receives at least one of distance information or connection state information with a peripheral device and can then provide it to the processor 120. The peripheral device corresponds to a portable terminal, a PC, or a smart watch. If there is more than a predetermined distance to a corresponding peripheral device on the basis of the distance information, the processor 120 sets radiation power to "high" and if there is less than the predetermined distance, sets the radiation power to "low". For example, when a user wears a wearable device such as a smart watch, if a distance to the wearable device is within a predetermined distance, radiation power is set to "low" so as to protect the user. Once a connection with the peripheral device is maintained, the processor 120 sets radiation power to "low" and once the connection is disconnected, sets the radiation power to "high". For example, when a user wears a wearable device such as a smart watch and moves out of a communication available range and thus a connection with the electronic device 101 is disconnected, communication quality can be adjusted by setting radiation power to "high".

In operation 770, the processor 120 confirms whether a radiation environment determined by a user is the second mode (for example, a performance mode). When the radiation power does not correspond to the second mode, the processor 120 returns to an event standby state.

In operation 780, when a radiation environment determined by a user is the second mode, the processor 120 generates a notification signal and can then notify to a user that the radiation power is set to "high". Even when a sensor event occurs in the second mode, the processor 120 maintains radiation power as "high" so that high communication quality can be maintained. The processor 120 protects a user through a notification signal.

Figure 8:
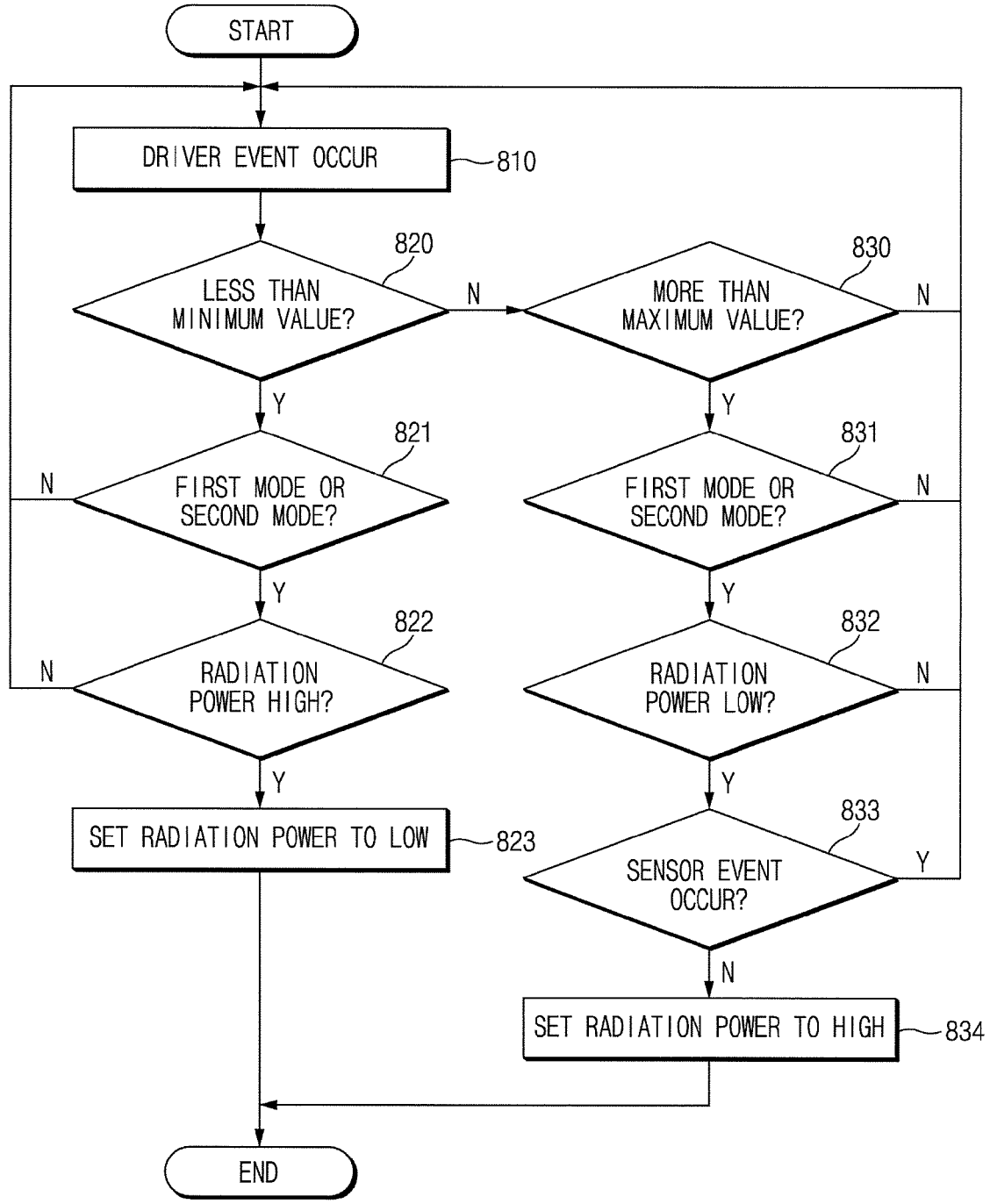
FIG. 8 illustrates a radiation power control process when a driver event occurs according to various embodiments of the present disclosure.

FIG. 8 is a flowchart illustrating a radiation power control process when a driver event occurs according to various embodiments of the present disclosure.

Referring to FIG. 8, in operation 810, the driver recognition module 220 detects whether a driver event occurs after a radiation environment is determined by a user. The driver recognition module 220 provides whether a driver event occurs or information on a data transmission speed according to the driver event to the processor 120. When the driver event occurs, the processor 120 compares a data transmission speed by the driver event and a reference value and can then set a radiation power of an antenna. According to various embodiments of the present disclosure, the processor 120 sets radiation power according to a specified transmission speed reference value. For example, when the transmission speed reference value is about 50 Mbps, the processor 120 sets radiation power to "low" at a transmission speed (for example, about 10 Mbps) of less than the transmission speed reference value. On the contrary, the processor 120 sets radiation power to "high" at a transmission speed (for example, about 60 Mbps) exceeding the transmission speed reference value. Hereinafter, a method of setting radiation power by dividing a reference value of a data transmission speed by a reference minimum value and a reference maximum value is examined.

In operation 820, the processor 120 confirms whether a data transmission speed is less than a reference minimum value (for example, about 1 Mbps). When the data transmission speed is less than the reference minimum value, the processor 120 improves power efficiency by lowering radiation power.

In operation 821, when the data transmission speed is less than the reference minimum value, the processor 120 confirms whether a radiation environment corresponds to the first mode or the second mode.

In operation 822, when the radiation environment corresponds to the first mode or the second mode, the processor 120 confirms whether radiation power is set to "high".

In operation 823, when the radiation power is set to "high", the processor 120 resets the radiation power to "low".

In operation 830, the processor 120 confirms whether a data transmission speed exceeds a reference maximum value (for example, about 100 Mbps). When the data transmission speed exceeds the reference maximum value, the processor 120 improves communication quality by raising radiation power.

In operation 831, when the data transmission speed exceeds the reference maximum value, the processor 120 confirms whether a radiation environment corresponds to the first mode or the second mode.

In operation 832, when the radiation environment corresponds to the first mode or the second mode, the processor 120 confirms whether radiation power is set to "low".

In operation 833, when the radiation power is set to "low", the processor 120 confirms whether a sensor event occurs. When a sensor event occurs, the processor 120 protects a user by maintaining radiation power as a "low" state.

In operation 834, when a sensor event does not occur, the processor 120 resets the radiation power to "high".

According to various embodiments of the present disclosure, the processor 120 can be set to adjust radiation power by a driver event with respect to an application not included in the radiation power adjustment app list 330 in the case of the first mode. In this case, the processor 120 adjusts radiation power through an additional app related event with respect to an application included in the radiation power adjustment app list 330.

Figure 9:
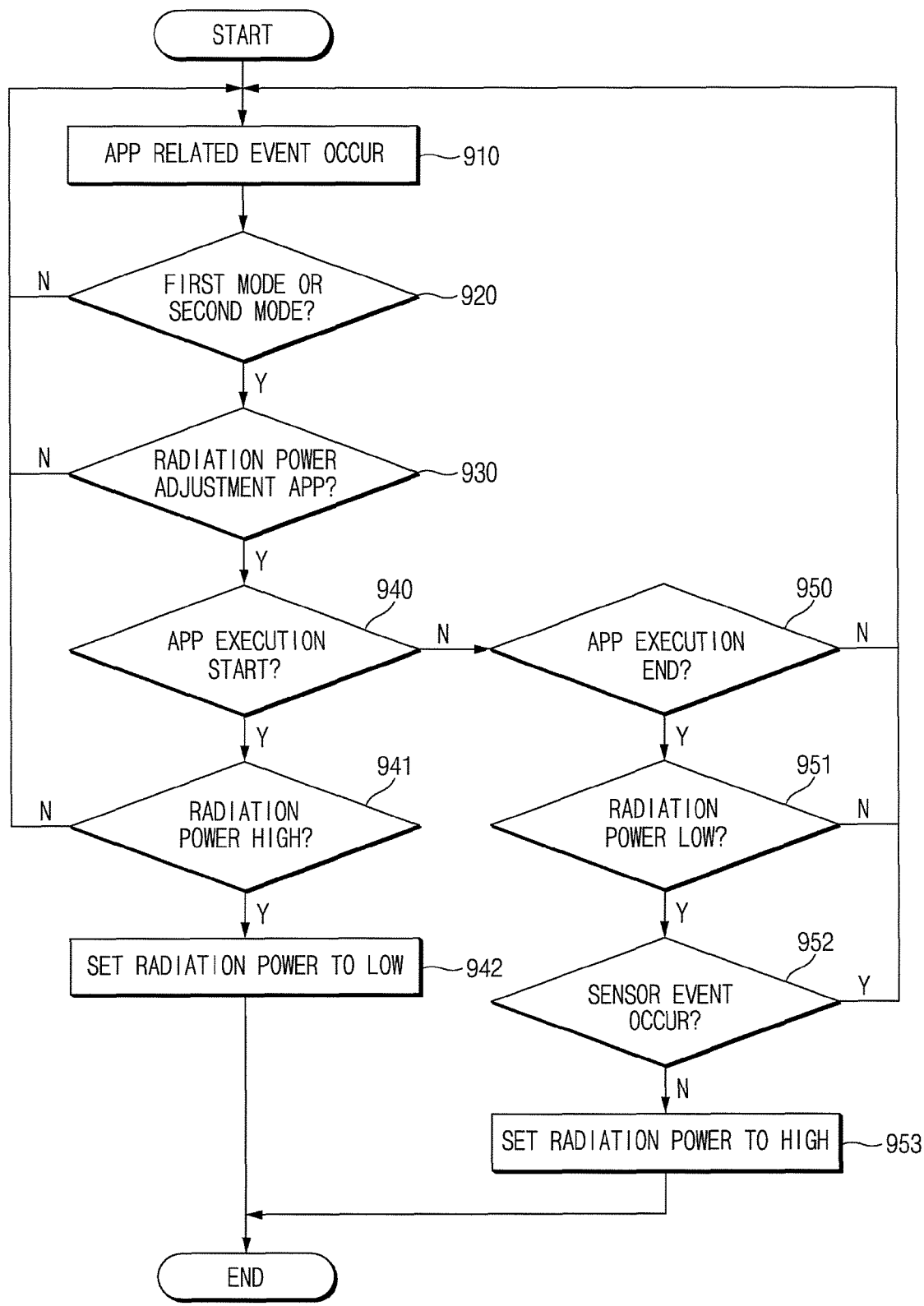
FIG. 9 illustrates a radiation power control process when an app related event occurs according to various embodiments of the present disclosure.

FIG. 9 is a flowchart illustrating a radiation power control process when an app related event occurs according to various embodiments of the present disclosure.

Referring to FIG. 9, in operation 910, the app recognition module 230 detects whether an app event occurs after a radiation environment is determined by a user. The app recognition module 230 can provide at least one of whether to execute a specified application, a start time, or an end time to the processor 120. When the app related event occurs, the processor 120 sets a radiation power of an antenna according an execution state of the application.

In operation 920, the processor 120 confirms whether a radiation environment corresponds to the first mode or the second mode. The processor 120 adjusts radiation power according to an operation of an application in the first mode or the second mode.

In operation 930, the processor 120 confirms whether the application is included in the radiation power adjustment app list 330. The radiation power adjustment app list 330 corresponds to an application list selected to adjust radiation power according to a predetermined condition. A corresponding application can be selected by a user or the processor 120. The processor 120 selects an application according to an execution method (for example, frequency of use, processor usage, and use of a specified communication module) of an application and includes the selected application in the radiation power adjustment app list 330. The processor 120 adjusts radiation power with respect to an application included in the radiation power adjustment app list 330.

In operation 940, the processor 120 confirms a start time of the application.

In operation 941, when the start time of the application is confirmed, the processor 120 confirms whether radiation power is set to "high".

In operation 942, when the radiation power is set to "high", the processor 120 resets the corresponding radiation power to "low".

In operation 950, the processor 120 confirms an end time of the application.

In operation 951, when the end time of the application is confirmed, the processor 120 confirms whether radiation power is set to "low".

In operation 952, when the radiation power is set to "low", the processor 120 confirms whether a sensor event occurs. When a sensor event occurs, the processor 120 protects a user by maintaining radiation power as a "low" state.

In operation 953, when a sensor event does not occur, the processor 120 resets the radiation power to "high".

Although the case that once application starts radiation power is lowered and when application ends, radiation power is raised is exemplarily shown in FIG. 9, the present disclosure is not limited thereto. For example, while a specified application is executed, the processor 120 increases radiation power, and when the application is terminated, decreases radiation power. As another example, while a function specified by an application is performed, the processor 120 increases or decreases radiation power, and when the function is terminated, decreases or increases radiation power.

According to various embodiments of the present disclosure, when the radiation environment corresponds to the third mode, the processor 120 adjusts radiation power according to an operation of an application. In the third mode, the processor 120 sets radiation power to "high" with respect to an application included in the radiation power adjustment app list 330. A user includes an application that is more frequently used and has relatively high data traffic in a corresponding list and can then adjust the radiation power according to the application execution. The processor 120 confirms whether a sensor event occurs at the start time of a corresponding application and can then reset radiation power to "high". When a sensor event occurs, the processor 120 protects a user by maintaining radiation power as "low". The processor 120 resets radiation power to "low" at the end time of the application.

According to various embodiments of the present disclosure, a radiation power controlling method includes detecting a user input for setting radiation power, determining a radiation environment of an antenna on the basis of at least the detected user input, and setting the radiation power of the antenna according to the determined radiation environment.

According to various embodiments of the present disclosure, the setting of the radiation power includes, when the determined radiation environment is the first mode, increasing the radiation power to more than a specified reference value. The setting of the radiation power includes, when the determined radiation environment is the second mode and power is applied to an electronic device, increasing the radiation power to more than a specified reference value. The setting of the radiation power includes, when the determined radiation environment is the third mode, decreasing the radiation power to less than the specified reference value.

According to various embodiments of the present disclosure, the radiation power controlling method further includes detecting a specified event and resetting the radiation power on the basis of at least one of the determined radiation environment or the event in relating to the specified event.

According to various embodiments of the present disclosure, when the radiation environment is the first or second mode and the execution of an application specified by a user occurs, the resetting of the radiation power includes setting the radiation power to less than a specified reference value.

When the radiation environment is the third mode and the execution of an application specified by a user occurs, the resetting of the radiation power includes setting the radiation power to more than a specified reference value.

According to various embodiments of the present disclosure, the specified event corresponds to at least one of a usage state of an electronic device by the user detected by a sensor functionally connected thereto, a state for transmitting data to the outside through the electronic device, or an execution state of a specified application. The sensor includes at least one of a grip sensor, a proximity sensor, a gyro sensor, an acceleration sensor, a bio sensor, or a temperature sensor.

According to various embodiments of the present disclosure, the resetting of the radiation power includes reducing a set radiation power to less than a specified reference value while the electronic device is in use by a user, confirming whether the specified event occurs additionally during a preset time when the radiation power is reduced to less than the specified reference, and maintaining or changing the reset radiation power according to whether the specified event occurs additionally.

According to various embodiments of the present disclosure, the resetting of the radiation power includes maintaining the set radiation power and providing a notification for the set radiation power to the user when the electronic device is in use by a user and the radiation environment is the second mode.

According to various embodiment of the present disclosure, the resetting of the radiation power includes, when the transmission speed of the data is less than a specified reference minimum value, setting the radiation power to less than a reference value or when the transmission speed of the data is more than a reference maximum value, setting the radiation power to more than a reference value.

According to various embodiment of the present disclosure, the resetting of the radiation power includes setting the radiation power to less than a reference value at the start time of the application or setting the radiation power to more than a reference value at the end time of the application.

FIG. 10 is a block diagram illustrating an electronic device according to various embodiments of the present disclosure. The electronic device 1001, for example, configures all or part of the above-mentioned electronic device 101 shown in FIG. 1.

Referring to FIG. 10, the electronic device 1001 includes at least one application processor (AP) 1010, a communication module 1020, a subscriber identification module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 controls a plurality of hardware or software components connected to the AP 1010 and also performs various data processing and operations with multimedia data by executing an operating system or an application program. The AP 1010 can be implemented with a system on chip (SoC), for example. According to an embodiment of the present disclosure, the AP 1010 further includes a graphic processing unit (GPU) (not shown).

The communication module 1020 (for example, the communication interface 160) performs data transmission through a communication between other electronic devices (for example, the electronic device 102 or the server 103) connected to the electronic device 1001 (for example, the electronic devices 101) via a network. According to an embodiment of the present disclosure, the communication module 1020 includes a cellular module 1021, a Wifi module 1023, a BT module 1025, a GPS module 1027, an NFC module 1028, and a radio frequency (RF) module 1029.

The cellular module 1021 provides voice calls, video calls, text services, or interne services through a communication network (for example, LTE, LTE-A, CDMA, WCDMA, UMTS, WiBro, or GSM). The CP 1021 performs a distinction and authentication of an electronic device in a communication network by using a subscriber identification module (for example, the SIM card 1024), for example. According to an embodiment of the present disclosure, the cellular module 1021 performs at least part of a function that the AP 1010 provides. For example, the cellular module 1021 performs at least part of a multimedia control function.

According to an embodiment of the present disclosure, the cellular module 1021 further includes a communication processor (CP). Additionally, the cellular module 1021 can be implemented with SoC, for example. As shown in FIG. 10, components such as the cellular module 1021 (for example, a CP), the memory 1030, or the power management module 1095 are separated from the AP 1010, but according to an embodiment of the present disclosure, the AP 1010 can be implemented including some of the above-mentioned components (for example, the cellular module 1021).

According to an embodiment of the present disclosure, the AP 1010 or the cellular module 1021 (for example, a CP) loads instructions or data, which are received from a nonvolatile memory or at least one of other components connected thereto, into a volatile memory and then processes them. Furthermore, the AP 1010 or the cellular module 1021 stores data received from or generated by at least one of other components in a nonvolatile memory.

Each of the Wifi module 1023, the BT module 1025, the GPS module 1027, and the NFC module 1028 includes a processor for processing data transmitted/received through a corresponding module. Although the cellular module 1021, the Wifi module 1023, the BT module 1025, the GPS module 1027, and the NFC module 1028 are shown as separate blocks in FIG. 10, according to an embodiment of the present disclosure, some (for example, at least two) of the cellular module 1021, the Wifi module 1023, the BT module 1025, the GPS module 1027, and the NFC module 1028 can be included in one integrated chip (IC) or an IC package. For example, at least some (for example, a CP corresponding to the cellular module 1021 and a Wifi processor corresponding to the Wifi module 1023) of the cellular module 1025, the Wifi module 1027, the BT module 1028, the GPS module 1021, and the NFC module 1023 can be implemented with one SoC.

The RF module 1029 can be responsible for data transmission, for example, the transmission of an RF signal. Although not shown in the drawings, the RF module 1029 includes a transceiver, a power amp module (PAM), a frequency filter, or a low noise amplifier (LNA). Additionally, the RF module 1029 further includes components for transmitting/receiving electromagnetic waves on a free space in a wireless communication, for example, conductors or conducting wires. Although the cellular module 1021, the Wifi module 1023, the BT module 1025, the GPS module 1027, and the NFC module 1028 share one RF module 1029 shown in FIG. 10, according to an embodiment of the present disclosure, at least one of the cellular module 1021, the Wifi module 1023, the BT module 1025, the GPS module 1027, and the NFC module 1028 performs the transmission of an RF signal through an additional RF module.

The SIM card 1024 can be a card including a subscriber identification module and can be inserted into a slot formed at a specific position of an electronic device. The SIM card 1024 includes unique identification information (for example, an integrated circuit card identifier (ICCID)) or subscriber information (for example, an international mobile subscriber identity (IMSI)).

The memory 1030 (for example, the memory 130) includes an internal memory 1032 or an external memory 1034. The internal memory 1032 includes at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory)

According to an embodiment of the present disclosure, the internal memory 1032 can be a Solid State Drive (SSD). The external memory 1034 can further include flash drive, for example, compact flash (CF), secure digital (SD), micro secure digital (Micro-SD), mini secure digital (Mini-SD), extreme digital (xD), or memorystick. The external memory 1034 can be functionally connected to the electronic device 1001 through various interfaces. According to an embodiment of the present disclosure, the electronic device 1001 can further include a storage device (or a storage medium) such as a hard drive.

The sensor module 1040 measures physical quantities or detects an operating state of the electronic device 1001, thereby converting the measured or detected information into electrical signals. The sensor module 1040 can include at least one of a gesture sensor 1040A, a gyro sensor 1040B, a pressure sensor 1040C, a magnetic sensor 1040D, an acceleration sensor 1040E, a grip sensor 1040F, a proximity sensor 1040G, a color sensor 104011 (for example, a red, green, blue (RGB) sensor), a bio sensor 10401, a temperature/humidity sensor 1040J, an illumination sensor 1040K, and an ultra violet (UV) sensor 1040M. Additionally/alternately, the sensor module 1040 can include an E-nose sensor (not shown), an electromyography (EMG) sensor, an electroencephalogram (EEG) sensor (not shown), an electrocardiogram (ECG) sensor (not shown), an infrared (IR) sensor (not shown), an iris sensor (not shown), or a fingerprint sensor (not shown). The sensor module 1040 can further include a control circuit for controlling at least one sensor therein.

The input module 1050 includes a touch panel 1052, a (digital) pen sensor 1054, a key 1056, or an ultrasonic input device 1058. The touch panel 1052 recognizes a touch input through at least one of capacitive, resistive, infrared, or ultrasonic methods, for example. Additionally, the touch panel 1052 can further include a control circuit. In the case of the capacitive method, both direct touch and proximity recognition are possible. The touch panel 1052 can further include a tactile layer. In this case, the touch panel 1052 provides a tactile response to a user.

The (digital) pen sensor 1054 can be implemented through a method similar or identical to that of receiving a user's touch input or an additional sheet for recognition. The key 1056 includes a physical button, a touch key, an optical key, or a keypad, for example. The ultrasonic input device 1058, as a device checking data by detecting sound waves through a mike (for example, the mike 1088) in the electronic device 1001, provides wireless recognition through an input tool generating ultrasonic signals. According to an embodiment of the present disclosure, the electronic device 1001 receives a user input from an external device (for example, a computer or a server) connected to the electronic device 200 through the communication module 1020.

The display 1060 (for example, the display 150) includes a panel 1062, a hologram device 1064, or a projector 1066. The panel 1062, for example, includes a liquid-crystal display (LCD) or an active-matrix organic light-emitting diode (AM-OLED). The panel 1062 can be implemented to be flexible, transparent, or wearable, for example. The panel 1062 and the touch panel 1052 can be configured with one module. The hologram 1064 shows three-dimensional images in the air by using the interference of light. The projector 1066 displays an image by projecting light on a screen. The screen, for example, can be placed inside or outside the electronic device 1001. According to an embodiment of the present disclosure, the display 1060 further includes a control circuit for controlling the panel 1062, the hologram device 1064, or the projector 1066.

The interface 1070 includes a high-definition multimedia interface (HDMI) 1072, a universal serial bus (USB) 1074, an optical interface 1076, or a D-subminiature (sub) 1078, for example. The interface 1070 can be included in the communication interface 160 shown in FIG. 1, for example. Additionally/alternately, the interface 1070 includes a mobile high-definition link (MHL) interface, a secure Digital (SD) card/multi-media card (MMC) interface, or an infrared data association (IrDA) standard interface.

The audio module 1080 converts sound and electrical signals in both directions. At least some components of the audio module 1080 can be included in the input/output interface 140 shown in FIG. 1, for example. The audio module 1080 processes sound information inputted/outputted through a speaker 1082, a receiver 1084, an earphone 1086, or a mike 1088.

The camera module 1091, as a device for capturing a still image and a video, includes at least one image sensor (for example, a front sensor or a rear sensor), a lens (not shown), an image signal processor (ISP) (not shown), or a flash (not shown) (for example, an LED or a xenon lamp).

The power management module 1095 manages the power of the electronic device 1001. Although not shown in the drawings, the power management module 1095 includes a power management integrated circuit (PMIC), a charger integrated circuit (IC), or a battery or fuel gauge, for example.

The PMIC can be built in an IC or SoC semiconductor, for example. A charging method can be classified as a wired method and a wireless method. The charger IC can charge a battery and can prevent overvoltage or overcurrent flow from a charger. According to an embodiment of the present disclosure, the charger IC can include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

The battery gauge measures the remaining amount of the battery 1096, or a voltage, current, or temperature of the battery 396 during charging. The battery 1096 stores or generates electricity and supplies power to the electronic device 1001 by using the stored or generated electricity. The battery 1096, for example, includes a rechargeable battery or a solar battery.

The indicator 1097 displays a specific state of the electronic device 1001 or part thereof (for example, the AP 1010), for example, a booting state, a message state, or a charging state. The motor 1098 converts electrical signals into mechanical vibration. Although not shown in the drawings, the electronic device 1001 includes a processing device (for example, a GPU) for mobile TV support. A processing device for mobile TV support processes media data according to the standards such as digital multimedia broadcasting (DMB), digital video broadcasting (DVB), or media flow.

Each of the above-mentioned components of the electronic device according to various embodiments of the present disclosure can be configured with at least one component and the name of a corresponding component can vary according to the kind of an electronic device. An electronic device according to an embodiment of the present disclosure can be configured including at least one of the above-mentioned components or additional other components. Additionally, some of components in an electronic device according to an embodiment of the present disclosure are configured as one entity, so that functions of previous corresponding components are performed identically.

The term "module" used in this disclosure, for example, can mean a unit including a combination of at least one of hardware, software, and firmware. The term "module" and the term "unit", "logic", "logical block", "component", or "circuit" can be interchangeably used. "module" can be a minimum unit or part of an integrally configured component. "module" can be a minimum unit performing at least one function or part thereof. "module" can be implemented mechanically or electronically. For example, "module" according to various embodiments of the present disclosure can include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, can be implemented using an instruction stored in computer-readable storage media. When at least one processor (for example, the processor 122) executes an instruction, it performs a function corresponding to the instruction. The computer-readable storage media includes the memory 130, for example. At least part of a programming module can be implemented (for example, executed) by processor 120, for example. At least part of a programming module includes a module, a program, a routine, sets of instructions, or a process to perform at least one function, for example.

The computer-readable storage media can include Magnetic Media such as a hard disk, a floppy disk, and a magnetic tape, Optical Media such as Compact Disc Read Only Memory (CD-ROM) and Digital Versatile Disc (DVD), Magneto-Optical Media such as Floptical Disk, and a hardware device especially configured to store and perform a program instruction (for example, a programming module) such as Read Only Memory (ROM), Random Access Memory (RAM), and flash memory. Additionally, a program instruction can include high-level language code executable by a computer using an interpreter in addition to machine code created by a complier. The hardware device can be configured to operate as at least one software module to perform an operation of this disclosure and vice versa.

A module of a programming module according to various embodiments can include at least one of the above-mentioned components or additional other components. Or, some programming modules can be omitted. Operations performed by a module, a programming module, or other components according to various embodiments of the present disclosure can be executed through a sequential, parallel, repetitive or heuristic method. Additionally, some operations can be executed in a different order or may be omitted. Or, other operations can be added.

According to various embodiment of the present disclosure, in a non-transitory computer-readable storage medium having an instruction for controlling an operation of an electronic device, the instruction can allow the electronic device to perform an operation for detecting a user input for setting radiation power, an operation for determining a radiation environment of an antenna on the basis of at least the detected user input, and an operation for setting the radiation power of the antenna according to the determined radiation environment.

According to various embodiments of the present disclosure, a radiation environment is determined by a user's input so that antenna communication quality can be adjusted.

According to various embodiments of the present disclosure, by dynamically corresponding to an event that requires an adjustment of radiation power occurring inside/outside an electronic, antenna radiation power can be managed efficiently.

Also, embodiments shown in this specification and drawings are provided as specific examples to describe technical content on a radiation power controlling method easily and help understanding and also do not limit the scope of the present disclosure. Accordingly, it should be interpreted that besides the embodiments listed herein, all modifications or modified forms derived based on the technical ideas of the present disclosure are included in the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A radiation power controlling method comprising:
    detecting a user input for setting a radiation power;
    determining a radiation environment of an antenna on the basis of at least the detected user input;
    setting the radiation power of the antenna according to the determined radiation environment;
    detecting a specified event, wherein the specified event corresponds to at least one of an approach of the user toward an electronic device or an execution state of a specified application; and
    resetting the radiation power of the antenna on the basis of at least one of the determined radiation environment or the specified event.

2. The method according to claim 1, wherein the-setting-of-the-radiation-power comprises increasing the radiation power to more than a specified reference value when the determined radiation environment is a first mode.

3. The method according to claim 1, wherein the-setting-of-the-radiation-power comprises increasing the radiation power to more than a specified reference value when the determined radiation environment is a second mode and power is supplied to an electronic device.

4. The method according to claim 1, wherein the-setting-of-the-radiation-power comprises reducing the radiation power to less than a specified reference value when the determined radiation environment is a third mode.

5. The method according to claim 1, wherein the-resetting-of-the-radiation-power comprises setting the radiation power to less than a specified reference value when the radiation environment is a first or second mode and an execution of an application specified by a user Occurs.

6. The method according to claim 1, wherein the-resetting-of-the-radiation-power comprises setting the radiation power to more than a specified reference value when the radiation environment is the third mode and an execution of an application specified by a user occurs.

7. The method according to claim 1, wherein the approach of the user is detected by a sensor functionally connected to the electronic device.

8. The method according to claim 7, wherein the sensor comprises at least one of a grip sensor, a proximity sensor, a gyro sensor, an acceleration sensor, a bio sensor, or a temperature sensor.

9. The method according to claim 7, wherein the-resetting-of-the-radiation-power comprises:
  reducing a set radiation power to less than a specified reference value when the electronic device is in use by a user;
  confirming whether the specified event occurs additionally during a preset time when the radiation power is reduced to less than the specified reference; and
  maintaining or changing the reset radiation power according to whether the specified event occurs additionally.

10. The method according to claim 7, wherein the-resetting-of-the-radiation-power comprises, when the electronic device is in use by a user and the radiation environment is a second mode, providing a notification for the set radiation power while maintaining the set radiation power.

11. The method according to claim 7, wherein the-resetting-of-the-radiation-power comprises setting the radiation power to less than a reference value when a transmission speed of the data is less than a reference minimum value or setting the radiation power to more than a reference value when a transmission speed of the data is more than a specified reference maximum value.

12. The method according to claim 7, wherein the-resetting-of-the-radiation-power comprises setting the radiation power to less than a specified reference value at a start time of the application or setting the radiation power to more than a specified reference value at an end time of the application.

13. An electronic device comprising:
  a display configured to be functionally connected to the electronic device and display a user interface (UI) for determining a radiation environment of an antenna; and
  a processor configured to:
    determine the radiation environment on the basis of a user input for the UI;
    set a radiation power of the antenna according to the determined radiation environment;
    detect a specified event, wherein the specified event corresponds to at least one of an approach of the user toward an electronic device or an execution state of a specified application; and
    reset the radiation power of the antenna on the basis of at least one of the determined radiation environment or the specified event.

14. The electronic device according to claim 13, further comprising an event detection module configured to detect a specified event, wherein when the specified event is detected, the processor resets the radiation power on the basis of at least one of the determined radiation environment or the event.

15. The electronic device according to claim 14, wherein when the radiation environment is a first or second mode and an execution of an application specified by a user occurs, the processor sets the radiation power to less than a specified reference value.

16. The electronic device according to claim 14, wherein when the radiation environment is a third mode and an execution of an application specified by a user occurs, the processor sets the radiation power to more than a specified reference value.

17. The electronic device according to claim 14, wherein the specified event corresponds to at least one of a usage state of an electronic device by the user detected by a sensor functionally connected to an electronic device, a state for transmitting data to the outside through the electronic device, or an execution state of a specified application.

18. The electronic device according to claim 17, wherein when a transmission speed of the data is less than a specified reference minimum value, the processor sets the radiation power to less than a reference value or when a transmission speed of the data is more than a specified reference maximum value, sets the radiation power to more than a reference value.

19. A non-transitory computer-readable storage medium storing an instruction for controlling an operation of an electronic device, wherein the instruction causes, when executed by the electronic device, the electronic device to perform:
  detecting a user input for setting a radiation power;
  determining a radiation environment of an antenna on the basis of at least the detected user input;
  setting the radiation power of the antenna according to the determined radiation environment;
  detecting a specified event, wherein the specified event corresponds to at least one of an approach of the user toward an electronic device or an execution state of a specified application; and
  resetting the radiation power of the antenna on the basis of at least one of the determined radiation environment or the specified event.

* * * * *